Patented July 17, 1928.

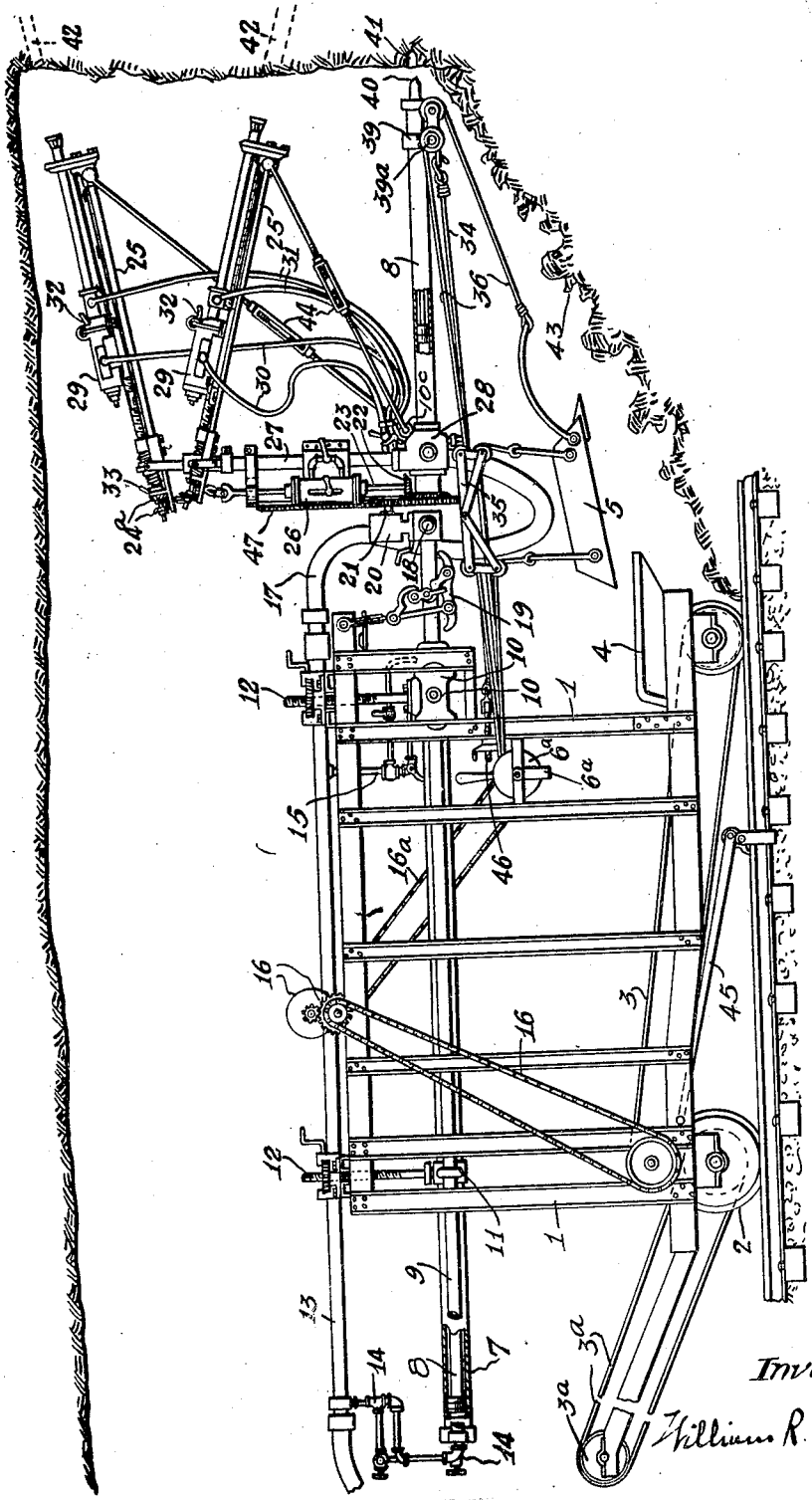

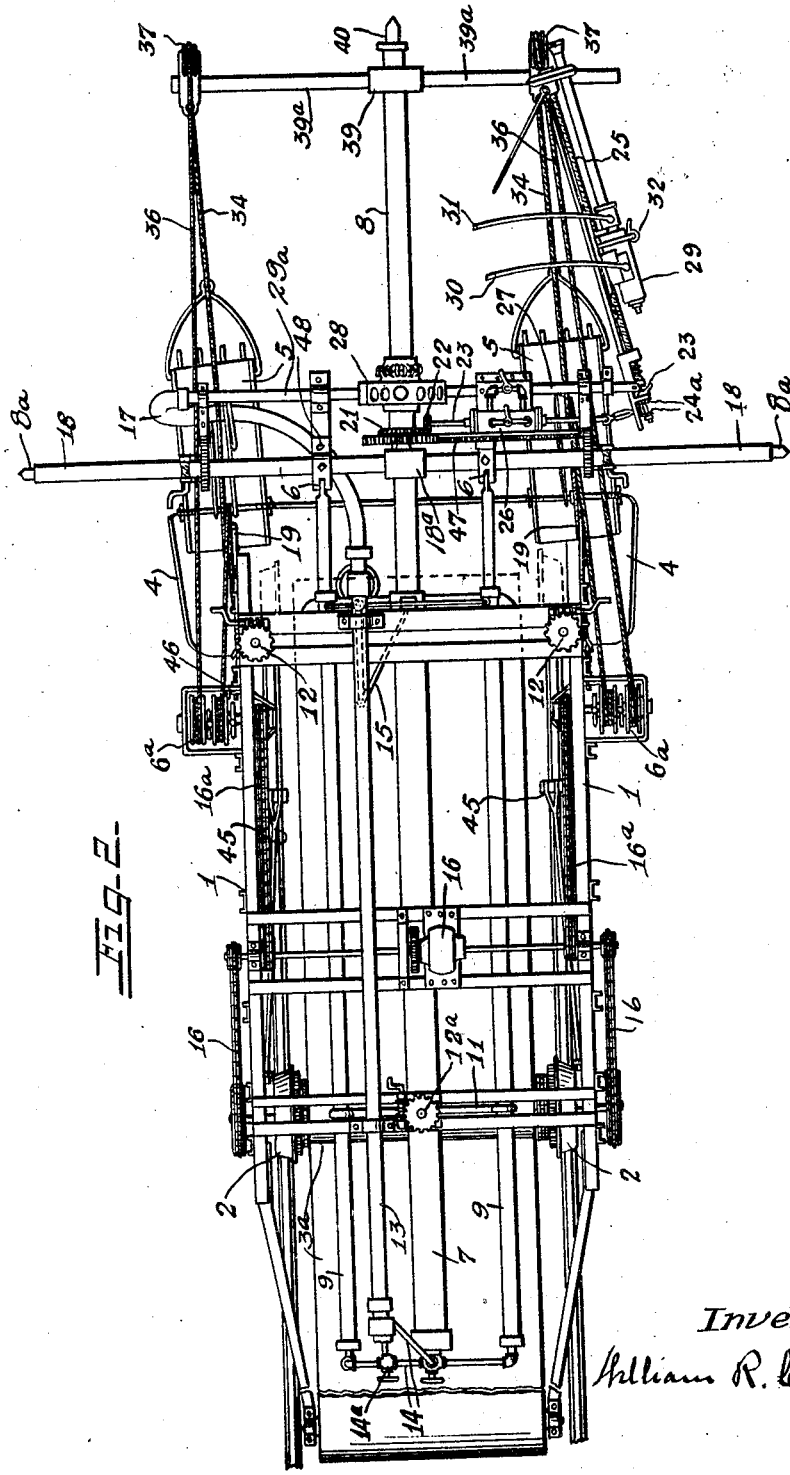

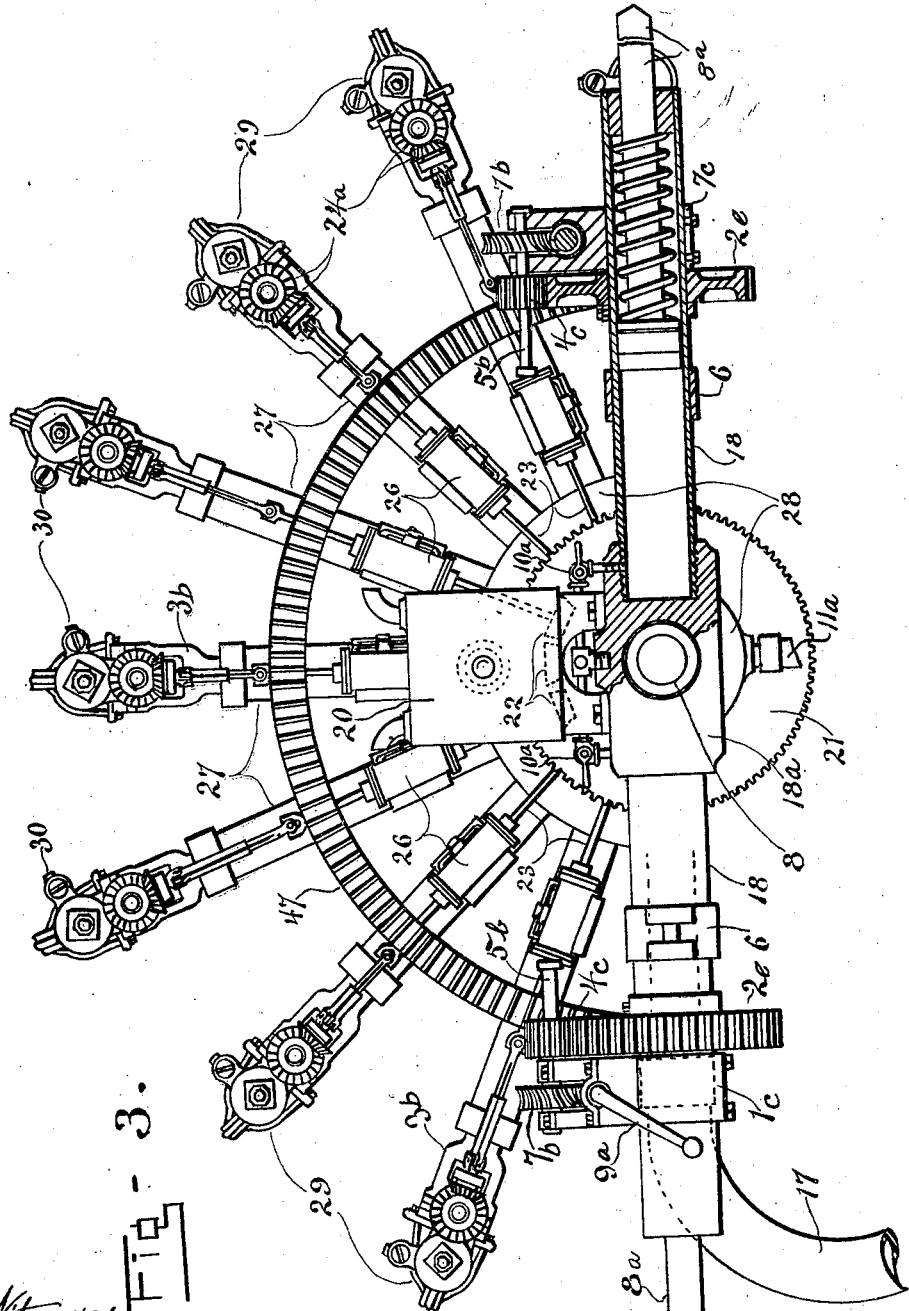

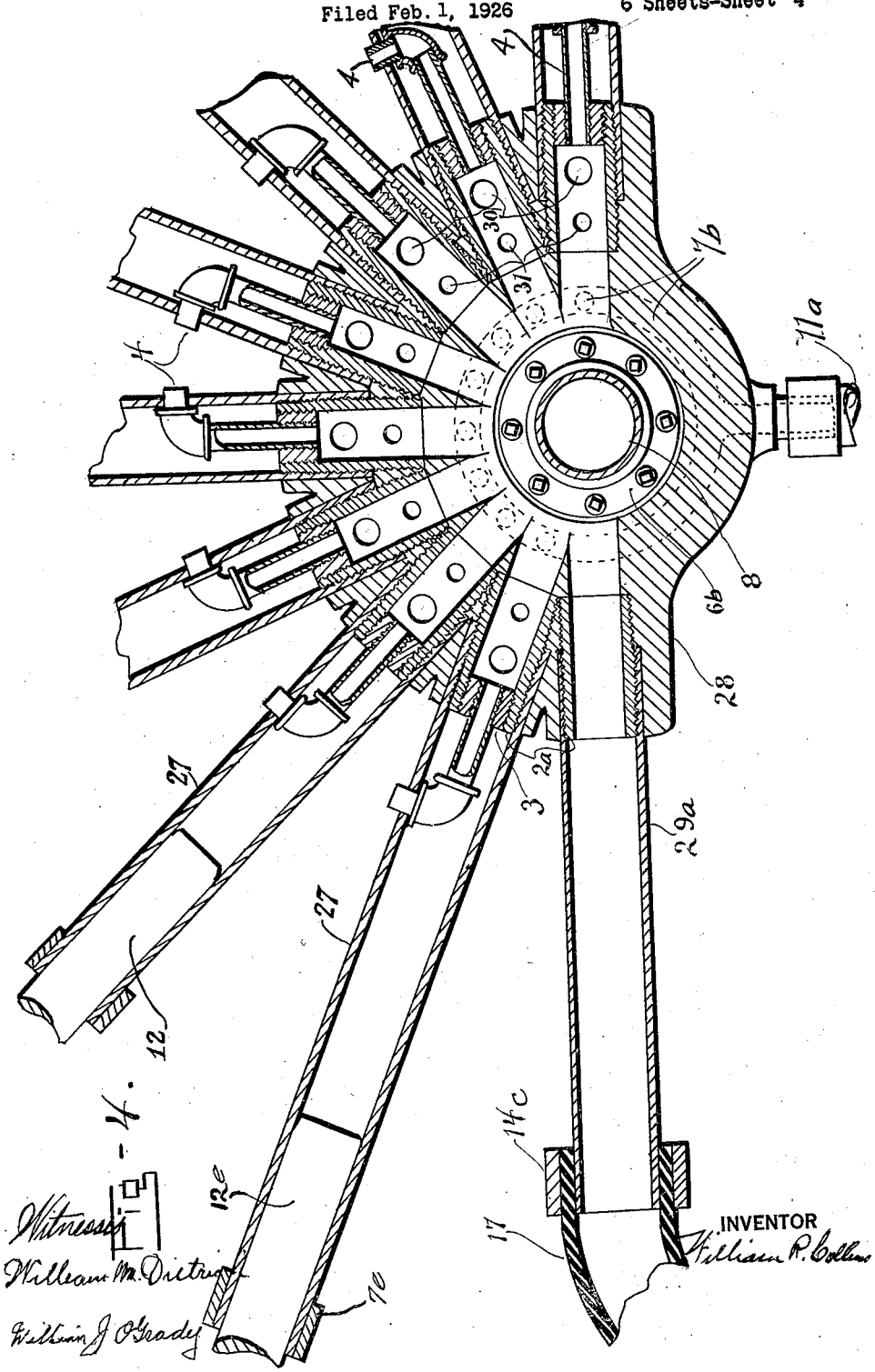

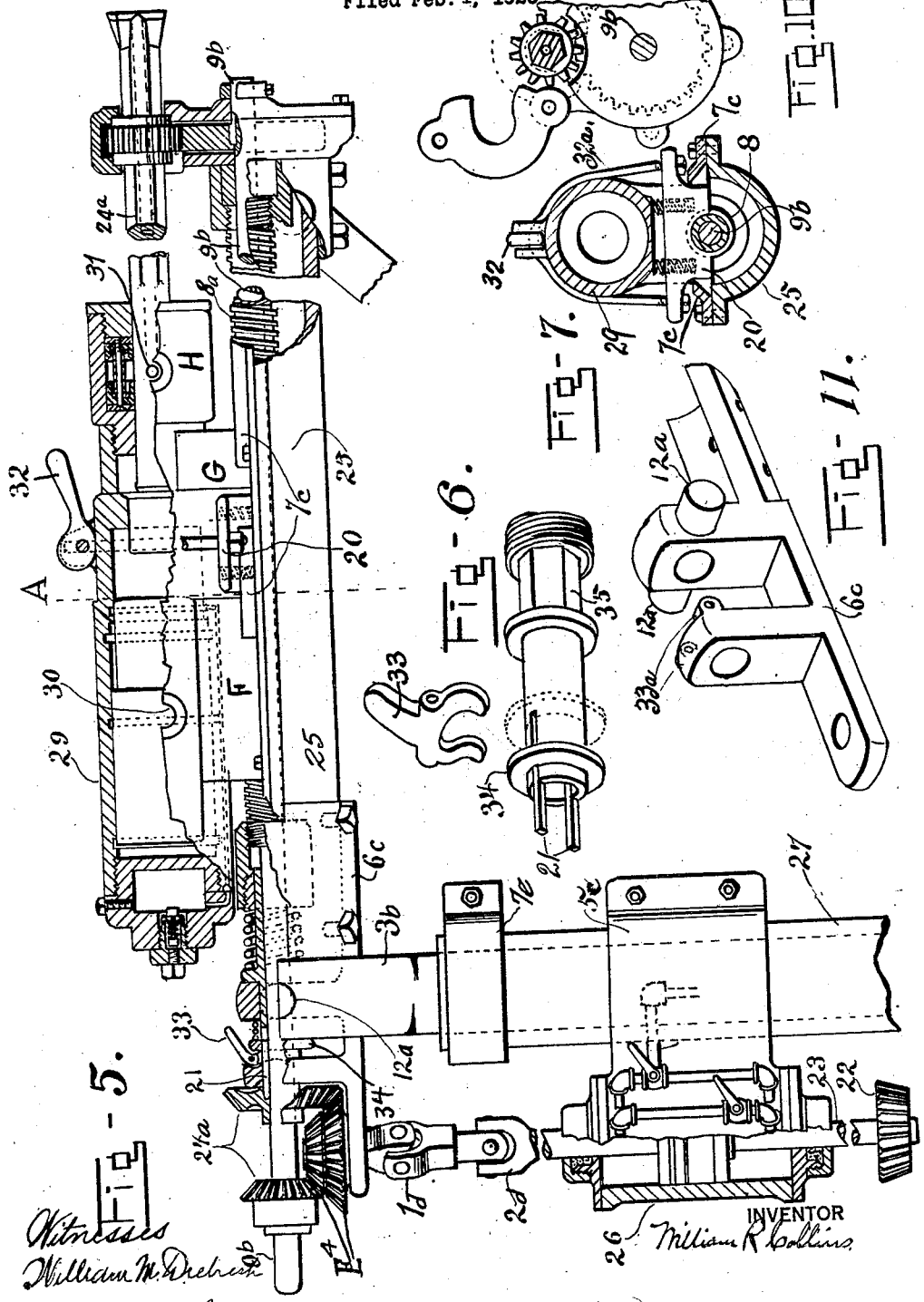

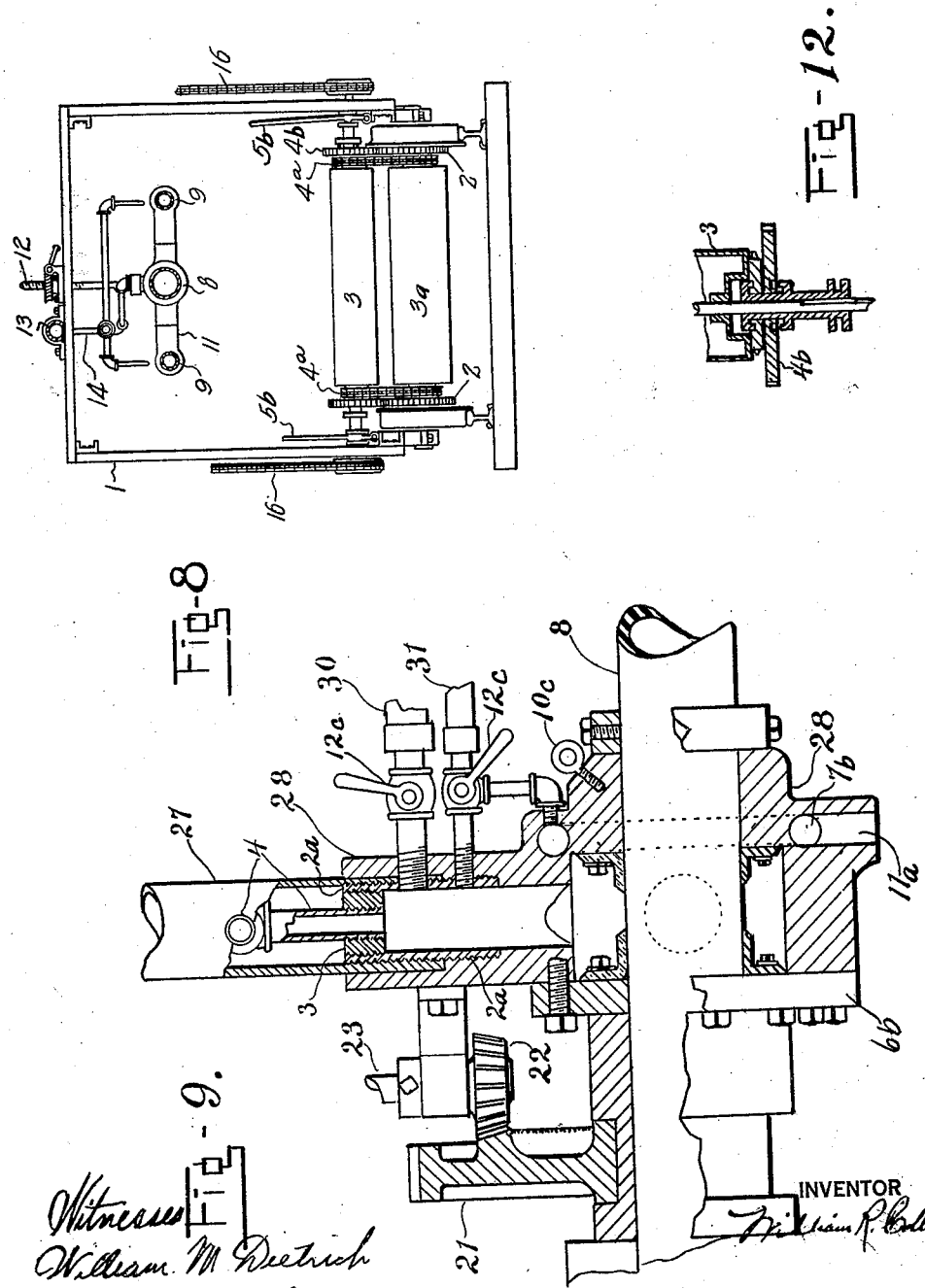

1,677,430

UNITED STATES PATENT OFFICE.

WILLIAM R. COLLINS, OF GEORGETOWN, COLORADO.

MULTIPLE-AIR-DRILL TUNNELING MACHINE.

Application filed February 1, 1926. Serial No. 85,396.

The invention relates to improvements in hard rock tunneling machines; and the objects of the improvements are to provide in a tunneling machine having a plurality of drills mechanically operated, first, a carriage propelled by its own motor; carrying conveyor belts and mucking cable reels and attachments; three pneumatic telescopic tubes actuated by compressed air, suspended in the frame of the machine; second, a rotatable hub mounted on the central telescopic tube, enclosing a suitably packed compressed air chamber and circular water channel or manifold with radial columns supporting mechanically operated air drills in the form of a semicircular battery; third, a semicircular ring having cogs on its rear face by which, in conjunction with mechanism clamped to lateral supporting columns, the battery of drills is rotated; fourth, means by which the battery of drills is moved back and forth along its axial supporting tube; fifth, two units of mechanism clamped, one on each lateral column, to aid in rotating the drill battery by means of a crank; sixth, individual friction clutches clamped to each drill column; seventh, means for mechanically rotating the hollow feed bar and the drill bit bar independently of each other; eighth, means to permit the drill body to move along its slide, or to remove it from its slide instantly, without interfering with the rest of the machine; ninth, conveyor belts, cable reels and mucking buckets to transfer the muck into the tram cars while the drills are in operation.

The invention is illustrated in the accompanying drawings, in which Fig. 1 is a side view of the drill carriage with the pneumatic telescopic tubes, drill battery, and one mucking element; Fig. 2, top view of frame showing the compressed air line, the air manifold into which is inserted the radial columns which support the battery, the larger central, axial pneumatic telescopic tube carrying the hub, and the two small pneumatic telescopic tubes which move to and fro the battery of drills, and the air connections at each end of tubes; Fig. 3, a rear view of the battery containing eight drills at the ends of their supporting columns, the rotating crank mechanism, the motor that actuates the drills thru the right-angled bevelled gear wheels, the air friction clutch, and the two lateral compressed air columns; Fig. 4, sectional view of hub, air spaces and inserted drill columns, air and water connections to drills and clutches, and water connection to circular water channel within the hub; Fig. 5, hammer drill attachments; Fig. 6, device to stop rotation of the hollow feed bar; Fig. 7, cross section showing movable member under the drill meshing with the thread on the hollow feed bar, thru which passes the drill bit rotating bar and the slide; Fig. 8, rear end view of machine carriage; Fig. 9, section showing compressed air manifold encircling its axial tube, water and air connections, the meshing gear wheels that actuate the feed and rotating bars; Fig. 10, casing and hinged cover bolted to distal end of drill slide with larger gear wheel keyed to end of rotating bar for drill bit, and small free gear wheel, thru which passes the water channel drill bit; Fig. 11, trunnion casting bolted to rear end of drill slide; Fig. 12, section of the clutches to transfer the motor power from the conveyor belts within the frame to the propelling wheels of the machine by means of the hand bars 5$^b$ (Fig. 8).

In Figs. 1 and 2 and 3 compressed air flows thru a length of pipe 1$\underline{3}$ on top of carriage frame 1, thence thru a short flexible hose 17 into the air manifold or hub 28, thence thru one system of short air lines 30 to the valves of the drills 29. Another system of small hose lines 31 conveys either air or water to a packing chamber in front end of body of the drill. At 2 are the propelling car wheels of the frame; on the inside faces of these wheels are cogs meshing with idler wheel 4$^b$ (Fig. 12) on the ends of the axle of the upper drum of conveyor belt 3.

The power to turn the wheels on rear end of frame and move the conveyor belts is furnished by the sprocket chains and motor 16 (Figs. 1 and 2). Short sprocket chains 4$^a$ convey the driving power from conveyor belt 3 to 3$^a$ (Fig. 8).

The conveyor belt 3 in two sections receives the muck from the hopper 4 discharged into it by the mucking bucket 5. A system of reels 6$^a$ for the cables of the mucking buckets 5 (one on each side of the machine) is actuated by motor and sprocket chain 16$^a$ (Figs. 1 and 2). A large, central, telescopic, pneumatic tube 7, with movable inner part or piston tube 8, provides an axis along which the hub 28, sustaining the battery of drills, is moved back and forth by the two smaller pneumatic, telescopic tubes 9, one on each side of the central tube. These pneumatic, telescopic tubes, which are raised or lowered by the screws 12, have movable supports 10 (Fig. 1) and 11 (Fig. 2) for the front and rear ends.

Part of the main air line 13 is attached to the top of the frame of machine. From this main air line lead small lines of air hose 14 (Figs. 1 and 2) carry air to the rear ends of the pneumatic tubes. The compressed air admitted here forces the inner sections of the telescopic tubes forward; the air admitted in the air connection 15 (Figs. 1 and 2) from the main air line to front ends of the three telescopic tubes here forces the inner sections of the tubes back, Figs. 1 and 2.

Motor and sprocket chains 16 and $16^a$ propel the carriage and actuate the conveyor belts and mucking reels. The flexible hose 17 connects the main air line 13 with the air space within the hub 28 (Figs. 1 and 2). A cross-casting $18^a$ (Figs. 2 and 3) encircles the central inner tube 8 of the central pneumatic tube; this casting carries on its top side the small motor 20 (Figs. 1 and 3) (electric or compressed air). Into each side of this cross-casting is inserted a lateral, pneumatic column 18 (Figs. 1, 2, and 3) containing a piston bar $8^a$. Two connecting links 6 (Figs. 2 and 3) attached to the front ends of the two smaller telescopic tubes 9 by means of bolts join these lateral columns to two radial columns of the drill battery (in Fig. 2, entire connection 48 is shown), so that the two parts, the hub 28 and the cross-casting $18^a$, are moved as one part of the machine back and forth along this section 8 of the central telescopic tube 7. When the battery of drills is to be rotated from the upper half of the breast of tunnel to the lower half, these links are disconnected. Hooks 19 on each side of the frame (Fig. 1) support the lateral arms 18 and the battery of drills when in a state of rest. The pinion wheel of the motor 20 meshes with the cogwheel 21, which has on its front surface cogs to mesh with the small cogwheels 22, which in turn are keyed to the shafts 23 that lead into the air friction clutches 26. (Figs. 1, 2, 3 and 9.) The shafts 23, after a break inside the friction clutches, reappear to connect with the right-angled bevel gear wheels $24^a$ at the rear ends of the drill slides 25 (Figs. 1, 2, 3 and 5). Radial columns 27 support the rear ends of the drill slides 25. The hub 28 receives the ends of the radial drill columns and contains a packed air chamber and circular water channel within (Figs. 4 and 9). Small air hose 30 carry compressed air from within the hub 28 to the different drill bodies 29. Small lines of hose 31 carry both compressed air and water from the hub 28 to the shank of the drill bits, thence thru the lengths of the bits to the bottom of the drill holes (Figs. 1 and 2). Triggers 32 (Figs. 5 and 7) release the drill bodies from their slides. Triggers 33 (see also Figs. 5 and 6) stop rotation of hollow feed bars $8^a$ without stopping rotation of included rotating bars $9^b$ of drill bits 24 (Fig. 5). The trolley wheels and frames 35, from which are suspended the mucking buckets 5 ride on a taut cable 34. The mucking bucket drag line cables 36 pass over pulleys 37, that slide sidewise along the cross arms $39^a$, which slide to and fro along section 8 of the central telescopic tube which passes through casting 39 (Figs. 1 and 2). The front end of the piston bar 40 inside of section 8 of the central telescopic tube is seated in the hitch 41 in the center of the breast of the tunnel, where 42 indicates direction of drill holes (Fig. 1). Muck 43 lies on floor of tunnel. Turn buckles 44 in bars connect the distal ends of drill slides 25 with ring bolts $10^c$ in hub 28 (Figs. 1 and 9). An anchor bar 45 (Figs. 1 and 2) holds the machine in place on its rails. A screw 46 tightens the mucking bucket trolley cable. A semicircular cogwheel 47 (see also Figs. 2 and 3) is clamped to each radial drill column, by which the entire battery of drills is made to rotate around its axis 8 from the upper half of the breast of the tunnel to the lower half. The castings $1^c$ are clamped on the lateral columns 18 to retain the mechanism that rotates the battery of drills. The free cogwheels $2^c$ (Fig. 3) mesh with the semicircular ring of cogs 47 clamped to the drill columns. The forked stems $3^b$ in ends of drill columns receive the trunnions in the back ends of the drill slides 25 (Fig. 5). Small cogwheels $4^c$ loose keyed, slide along small shafts $5^b$ (Fig. 3). These cogwheels $4^c$ mesh with the free cogwheels $2^c$. Worm gear wheels $7^b$ are keyed to shaft $5^b$. The crank handle $9^a$ turns this rotating mechanism, and when used on one side the small cogwheel $4^c$ is slid out of mesh with the cogwheel $2^c$ on the other side. The piston bars $8^a$ engage in hitches on each side of the tunnel (Figs. 2 and 3). These two hitches together with the hitch in the center of the breast of the tunnel and the machine carriage firmly support the battery of drills when in operation.

Small two-way valves $10^a$ (Fig. 3) admit compressed air into the lateral columns behind the piston bars $8^a$. Flexible air hose 17 connects with the air chamber in hub 28 thru the radial air column $29^a$ (Fig. 2). Radial drill columns 27 support the drills, and are bound together by being clamped to the semicircular member 47.

Drill columns 27 are inserted into the hub 28 (Figs. 4 and 9), showing air spaces and distributing air and water connections 12ᶜ (Fig. 9). Threaded tubes 2ᵃ are screwed into the spokes of the hub 28, and perforated plugs 3 are screwed into the ends of the tubes 2ᵃ. The air connections 4 are for the friction clutches (Figs. 4 and 9). The collar 6ᵇ bolted onto the rear face of the hub 28, completes the air chamber within the hub (see Fig. 9). The dotted circles 7ᵇ indicate the water channel within the hub (Figs. 9 and 4). The connections for the small lines of hose 30 and 31 carry air to the drills and water to the shanks of the drill bits. A section of the inner or piston part 8 of the central pneumatic tube 8 is shown (Fig. 1); also water supply attachment 11 (Figs. 4 and 9). Stems of trunnion forks 12ᵉ that support rear ends of drill slides 25, are movable within the radial columns 27 (Fig. 4). The clamps 7ᵉ around the distal ends of radial columns retain the stems 12ᵉ. The end of the flexible air hose 17 is joined to the air column 29ᵃ at attachment 14ᶜ (Fig. 4).

A drill (Fig. 5) is used only to illustrate the use and relations of some of the different members of the invention. Knuckles and socket joints, 1ᵈ and 2ᵈ, connect the shaft of the friction clutch 26 with the four bevelled cogwheels 24ᵃ and E⁴ that actuate the hollow feed bar 8ᵃ and the included bar 9ᵇ for rotating the drill bit 24. The forked supports 3ᵇ of the trunnions 12ᵃ (Fig. 11) are shown in Figs. 3 and 5. A clamp 7ᵉ is on distal ends of radial column 27, and clamp 5ᶜ is for friction clutch 26. The rear end of the drill slide 25 is bolted to casting 6ᶜ (Figs. 5 and 11). Angle bars 7ᶜ (Fig. 7) retain the drill on its slide. The rotating bar 9ᵇ passes thru the hollow feed bar 8ᵃ. A member 20, threaded on one side (see Figs. 5 and 7), meshes with hollow feed bar; this piece is unmeshed by throwing back the eccentric trigger 32 thru which passes a U-shaped rod 32ᵃ bolted to the edges of the member (Figs. 5 and 7), and its use is to engage the drill body with, or release it from, the hollow feed bar 8ᵃ. Cogwheel 22 is keyed to shaft 23 of the friction clutch 26 (Fig. 9). The larger right angled beveled gear wheel 24ᵃ is an idler wheel rotating on the bar 9ᵇ. By means of trigger 33, hinged at 33ᵃ to an upright on casting 6ᶜ, the collar 34 with two lugs 21 (Figs. 5 and 6) is meshed with the idler wheel 24ᵃ so as to cause the hollow feed bar to rotate. The smaller of the bevelled gear wheels 24ᵃ is keyed to bar 9ᵇ for rotating the drill bit. Two muckers operate the two mucking buckets, while two drillers operate the eight drills of the machine simultaneously against the upper half of the breast of the tunnel.

I claim:

1. In a tunneling machine, the combination of a carriage propelled by its own motor, containing within its frame conveyor belts and mucking reels, and supporting three parallel pneumatic tubes.

2. In a tunneling machine, the combination of a carriage supporting within its frame conveyor belts for loading muck into tram cars, mucking reels, three parallel pneumatic telescopic tubes with proper air connections, a hollow, rotatable, sliding hub encircling the inner section of the telescopic tube. Into this hollow hub are inserted a plurality of radials or drill supporting columns.

3. In a tunneling machine, the combinations of the central pneumatic telescopic tube, its inner section bearing a hollow rotatable hub containing an air space to distribute compressed air to the drills and a circular water channel to distribute water to the drill bits, and having inserted into it a plurality of radial drill columns, these columns being bound together by a semicircular ring having cogs on its rear surface.

4. In a tunneling machine, the combination of pneumatic telescopic tubes, the central one bearing a hollow hub, into which is inserted a plurality of drill columns; the hub united to the front ends of the two smaller pneumatic telescopic tubes, by which it is moved back and forth along the central tube that it encircles.

5. In a tunneling machine, the combination of telescopic tubes carrying and moving back and forth a hollow hub sustaining a plurality of drill columns; mechanism clamped to lateral supporting columns by which the hub with its inserted drill columns is rotated about the central tube as an axis, as the mechanism meshes with the cogs on the semicircular ring clamped to the drill columns.

6. In a tunneling machine, the combination of a movable, rotatable, hollow hub, bearing a plurality of drill columns or radials, to the rear surfaces of which are clamped individual compressed air friction clutches that permit continued operation of the rest of the machine when one or more drills are obstructed in action.

7. In a tunneling machine, the combination of a sliding rotatable hub, bearing a plurality of drill columns, rotatable by semicircular cogged ring, meshing with worm-geared turning apparatus clamped on each lateral supporting column; a friction clutch whose out-going or driving shaft is keyed to double right-angled bevelled cogwheels, one of which meshes with an idler cogwheel which is engaged by a sliding collar and lugs to rotate the hollow feed bar; and the other is keyed to the bar passing thru the hollow feed bar, so that the hollow feed bar and drill bit are rotated independently of each other.

8. In a tunneling machine, the combination of a plurality of drills, mechanically operated and supported by columns bearing friction clutches keyed to shafts of double bevelled cogwheels rotating a hollow drill feed bar and included drill bit rotating bar; the thread of the hollow feed bar meshing with the threads of the adjacent side of a member placed between the drill body and the hollow feed bar, said member being held in mesh with the feed bar by four small coiled springs between the adjacent surfaces of the member and the drill body, said member being unmeshed from the hollow feed bar by the U-shaped rod and trigger on top of the drill body when it is required to move the drill body along its slide, or to remove the drill body from its slide.

9. In a tunneling machine, the combination of a carriage supporting within its frame three telescopic pneumatic tubes affording means for the operation of a plurality of mechanically operated drills; means for removing the muck while drilling is in progress, consisting of cable reels, for mucking buckets on each side of frame of machine, and conveyor belts within the machine frame.

In testimony whereof I have set my hand.

WILLIAM R. COLLINS.